United States Patent
Grosch

(10) Patent No.: US 11,550,270 B2
(45) Date of Patent: Jan. 10, 2023

(54) REDUNDANT AUTOMATION SYSTEM, METHOD FOR CREATING THE AUTOMATION SYSTEM, COMPUTER PROGRAM AND COMPUTER READABLE MEDIUM

(71) Applicant: Siemens Aktiengesellschaft, Munich (DE)

(72) Inventor: Thomas Grosch, Roßtal (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 54 days.

(21) Appl. No.: 17/061,707

(22) Filed: Oct. 2, 2020

(65) Prior Publication Data

US 2021/0103254 A1  Apr. 8, 2021

(30) Foreign Application Priority Data

Oct. 4, 2019 (EP) .................................... 19201463

(51) Int. Cl.
G06F 11/00 (2006.01)
G05B 9/03 (2006.01)
(Continued)

(52) U.S. Cl.
CPC ........... *G05B 9/03* (2013.01); *G05B 19/0428* (2013.01); *G06F 11/1675* (2013.01);
(Continued)

(58) Field of Classification Search
CPC .................. G05B 9/03; G05B 19/0428; G05B 19/4185; G05B 19/41855; G05B 2219/24183;
(Continued)

(56) References Cited

U.S. PATENT DOCUMENTS

2012/0089749 A1* 4/2012 Barthel ............... G06F 11/2033
710/5
2013/0290776 A1  10/2013 Grosch et al.
(Continued)

FOREIGN PATENT DOCUMENTS

EP  2657797  10/2013
EP  3070548  9/2016

OTHER PUBLICATIONS

Hegazy, Tamir et al., Industrial Automation as a Cloud Service, 2014, IEEE (Year: 2014).*
(Continued)

*Primary Examiner* — Marc Duncan
(74) *Attorney, Agent, or Firm* — Cozen O'Connor

(57) ABSTRACT

A method for creating a redundant automation system, a computer program and a computer-readable medium, wherein the redundant automation system includes at least one automation installation to be controlled that is installed at an installation location and two control applications that are communicatively interconnected via a synchronization path, and includes a plurality of communication hubs and communication paths connecting these to one another, where one of the control applications operates as the master and the other control application operates as a reserve, such that when the control application operating as the master fails, the control application operating as the reserve function as the master, and where the locations of the computing resources for the control applications are selected such that the control applications are connected to the at least one automation installation via two different communication paths preferably having no or a minimal number of common communication hubs.

10 Claims, 7 Drawing Sheets

(51) Int. Cl.
*G05B 19/042* (2006.01)
*G06F 11/16* (2006.01)
*G06F 11/20* (2006.01)

(52) U.S. Cl.
CPC ...... *G06F 11/1687* (2013.01); *G06F 11/2038* (2013.01); *G06F 11/2097* (2013.01); *G05B 2219/24183* (2013.01); *G05B 2219/24186* (2013.01); *G06F 11/2033* (2013.01); *G06F 11/2048* (2013.01)

(58) Field of Classification Search
CPC ....... G05B 2219/24186; G06F 11/1675; G06F 11/1687; G06F 11/2033; G06F 11/2038; G06F 11/2048; G06F 11/2097; H04L 29/08315; H04L 41/04; H04L 41/12; H04L 41/14; H04L 41/145; H04L 67/025; H04L 67/125
See application file for complete search history.

(56) References Cited

U.S. PATENT DOCUMENTS

| | | | |
|---|---|---|---|
| 2016/0154693 | A1* | 6/2016 | Uhde .................. G06F 11/0709 714/49 |
| 2016/0274552 | A1* | 9/2016 | Strohmenger ......... G06Q 10/06 |
| 2017/0063666 | A1* | 3/2017 | Ahuja ................... H04L 45/121 |
| 2019/0199626 | A1 | 6/2019 | Thubert et al. |
| 2019/0302742 | A1 | 10/2019 | Grosch et al. |

OTHER PUBLICATIONS

EP Search Report dated Feb. 17, 2020 based on EP19201463 filed Oct. 4, 2019.
Anonymous: "IP Address—Wikipedia", Wikipedia, 7. Oct. 2019, pp. 1-11.
Anonymous: "IP Routing—Wikipedia", Wikipedia, 7. Oct. 2019, pp. 1-3.

\* cited by examiner

REDUNDANT AUTOMATION SYSTEM, METHOD FOR CREATING THE AUTOMATION SYSTEM, COMPUTER PROGRAM AND COMPUTER READABLE MEDIUM

BACKGROUND OF THE INVENTION

1. Field of the Invention

The present invention relates to a method for creating a redundant automation system and a computer program, a computer-readable medium, where the redundant automation system comprises at least one automation installation to be controlled, which is installed at an installation location with associated peripheral units and two control applications, which are communicatively coupled to one another via a synchronization path, configured to control the automation installation and which are communicatively connected to the automation installation, where one of the control applications operates as the master and the other control application operates as a reserve, such that in the event of the application operating as the master control fails, the control application operating as a reserve takes over and functions as the master. The present invention further relates to

2. Description of the Related Art

In automation environments, there is an increasing requirement for high availability solutions suitable for reducing any stoppage periods of an automation installation to a minimum. Against this background, redundant automation systems of are currently know, which are characterized by the fact that two mutually synchronizing control applications are connected to the peripheral units of the automation installation such that, in the event of a failure, the function of the control application operating as the master can be taken over at any time by the control application working as a reserve. With respect to the frequency of the synchronization and the scope thereof, a distinction can be made between various manifestations, particularly warm standby and hot standby.

Recently, the possibility of outsourcing control applications to a cloud has been increasingly discussed. A cloud is in particular an infrastructure that is, for example, made available via the internet and which, as a rule, provides storage space, computing power and/or application software without requiring corresponding infrastructures to be installed and stored on a local computer. With a cloud, as a rule, the hardware is not operated or provided by the actual user of an application. A cloud or cloud computing can be particularly understood to mean the provision of IT infrastructure as a service, possibly from a remote location. A cloud can be reached via the internet or also operated by a company as a "private cloud" with which the IT infrastructure can be reached via a network, such as a company intranet.

When outsourcing control applications to a cloud, it should be noted that annual failure times of several hours are to be expected with all large cloud providers. A consideration on a monthly basis even shows that a mean time to failure (MTTF) of less than one month is to be expected, where the failures entail a few minutes to a few hours of downtime. For example, an analysis of the failures of various cloud providers in March 2019 revealed an average downtime of approximately 17 minutes within the 30 day period, where the two cloud providers with the longest failure times were not taken into account. Therefore, the users of cloud-based services must assume their applications will be unavailable for a few minutes each month. In the case of a control application, this unavoidably results in a stoppage of the automation installation, which will probably be unacceptable to the operator of the installation. In this context, it should be noted that present-day programmable logic controllers have an average lifetime of 10 years and more depending upon the type.

As a result, the availability achievable at present or the achievable MTTF of cloud services seems to be adequate for current applications, such as webservers or databases. An attempt is frequently made to increase availability for these applications using cold or warm standby systems, which are started in the event of a failure. However, the availability of such conventional system considered inadequate for applications in automation technology because the status of the control applications, and hence of the automation process, must be maintained in the event of a failure. This can only be achieved by using "hot stand-by" systems.

SUMMARY OF THE INVENTION

In view of the foregoing, it is therefore an object of the present invention to provide an alternative redundant automation system and a method for creating the redundant automation system that over comes the problems found in convention automation systems.

This and other objects and advantages are achieved in accordance with the invention by a redundant automation system comprising at least one automation installation to be controlled, which is installed at an installation location and two control applications, which are communicatively coupled to one another via a synchronization path, configured to control the automation installation, form part of a cloud-computing structure of which the computing resources are provided at different locations and which are communicatively connected to the automation installation via the internet or via a comparable computer network, and which has a plurality of communication hubs and communication paths connecting these to one another, where one of the control applications operates as the master and the other control application operates as a reserve, such that in the event that the control application operating as the master fails, the control application operates as a reserve takes over and functions as the master and where the locations of the computing resources for the control applications are selected such that the control applications are connected to the automation installation via two different communication paths that preferably have no or a minimal number of common communication hubs. Therefore, in accordance with the invention, the control applications are outsourced to a cloud. Herein, to improve the mean time to failure (MTTF), the control applications are communicatively connected to the automation installation or to the peripheral units thereof via separate communication paths of the internet or the comparable computer network. Herein, it is ensured that the communication paths have no or, if this is not possible due the installation location and/or locations of the computing resources for the control applications in relation to the topology of the internet or the comparable computer network, a minimal number of common communication hubs. This is advantageous because, if the communication path between the control application working as the master and the automation installation were to fail, reliable function of the communication path between the control application operating as the reserve and the automation installation is ensured and the control application operating as the reserve can take over and function as the master. This results in an improvement of the MTTF of the control applications to a value suitable for automation technology.

In according with one embodiment of the present invention, the synchronization path connecting the control applications to one another is a communication path of the internet or the comparable computer network, where the synchronization path and the two communication paths connecting the control applications to the automation installation have no or a minimal number of common communication hubs. This also results in an improvement of the MTTF of the control applications.

The computing resources for the control applications are preferably computing centers, i.e., buildings or premises that accommodate the central computing technology of one or even more companies. The advantage consists in the fact that it is possible to access existing resources.

Advantageously, the computing resources for the control applications are decoupled from one another with respect to energy supply. If the computing resources are, for example, different computing centers decoupled from one another with respect to their supply, then the automation system is also available when the energy supply of a computing center fails. In particular, the locations of the computing resources for the control applications are supplied with energy from separate networks that are completely decoupled from one another. Thus, the locations can, for example, be selected such that they are arranged in different regions or states with non-intercoupled energy supplies.

It is also an object of the present invention to provide a method for creating a redundant automation system, in particular an automation system in accordance with disclosed embodiments of the invention, where the method includes: a) providing information on the network topology of the internet or a comparable computer network including information on its structure of communication hubs and on communication paths connecting these to one another; b) providing information on computing centers present within the network topology, including information on the locations thereof; c) identifying the installation location of an automation installation to be controlled within the network topology; d) identifying at least one pair of computing centers, which is connectable to the automation installation within the network topology via communication paths and which have a minimal number of overlaps and/or common communication hubs, in particular no overlaps and/or no common communication hubs; and e) selecting a pair of computing centers identified in step d) including the associated communication paths.

In a first step a), information on the network topology of the internet or a comparable computer network is collected and provided, i.e., information on the specific arrangement of the devices and lines that form the Internet or computer network, are connected to each other via the computer and exchange data, where the term "lines" should be understood to mean both wired and radio-based transmission links. The information can be obtained base on the basis on static information, such as, existing maps relating to submarine cables and/or by determining the network topology by means of network management protocols etc. In a further step b) information is provided on computing centers present within the network topology, including information on the locations thereof. In step c), the installation location of the automation installation to be controlled within the network topology is identified. When steps a) to c) have been performed, in principle all the information required to connect the automation installation to be controlled or the peripheral units thereof to one of the computing centers is available. In a further step d), at least one pair of computing centers is identified, which can be connected within the network topology via communication paths with the automation installation and have a minimal number of overlaps and/or common communication hubs, in particular no overlaps and/or no common communication points. Therefore, particularly those computing centers are identified which, if possible, can be connected to the automation installation on completely independent communication paths of the known network topology. In a step e), one of the pairs of computing centers, including the associated communication paths, identified in step d) is selected. Accordingly, a maximum MTTF is achieved in the event of one of the communication paths between the automation system and one of the two computing centers failing.

Advantageously, in step b) additional information on the power supply and/or on the present utilization and/or on the computing power of the computing centers is provided, where the selection in step e) occurs taking account of at least one item of this additional information. If, in step d), for example, a plurality of potential pairs of computing centers are determined with which the automation installation could be connected via different communication paths, then the selection in step e) is made based on further criteria. For example, a check can be performed to determine which pairs of computing centers have independent power supplies so that only pairs of computing centers with an independent power supply are included in the narrower selection.

Alternatively or additionally, the present utilization of the computing centers of the pairs identified in step d) can be checked. Accordingly, for the selection in step e), preference is given to the pairs whose computing centers have a low level of utilization. Alternatively or additionally, the computing power of the corresponding computing centers can be used as a selection criterion in step e), where precedence is given to computing centers with high computing power. If a plurality of additional criteria is included in the selection in step e), priorities or importance identifiers can be assigned to the individual criteria.

In accordance with one embodiment of the present invention, the method further includes: f) providing two control applications configured to control the automation installation, where the control applications are configured such that one of the control applications operates as the master and the other control application operates as the reserve and such that, in the event of the control application operating as the master failing, the control application operating as the reserve takes over and functions as the master, g) storing the control applications in the computing centers selected in step e); h) coupling the control applications via a synchronization path; and i) connecting the control applications to the automation installation via the communication paths selected in step e).

Herein, the synchronization path selected in step h) is preferably selected such that the synchronization path and the two communication paths connecting the control applications to the automation installation have no or a minimal number of common communication hubs.

It is a further object of the present invention to provide a computer program comprising program code means which, when executed by a processor at least one computer, causes the at least one computer to perform the method in accordance with disclosed embodiments of the invention.

Moreover, it is also an object of the invention to provide a computer-readable medium that comprises program instructions which, when executed by a processor of at least one computer, cause the at least one computer to perform the method in accordance with the disclosed embodiments of the invention.

The computer-readable medium can, for example, be a CD-ROM or a DVD or a USB or a flash memory. It should be noted that a computer-readable medium should not exclusively be understood to be a physical medium, but may also, for example, also be present in the form of a data flow and/or a signal representing a data flow.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear from the following description with reference to the attached drawing, in which.

DETAILED DESCRIPTION OF THE EXEMPLARY EMBODIMENTS

Figure 1:
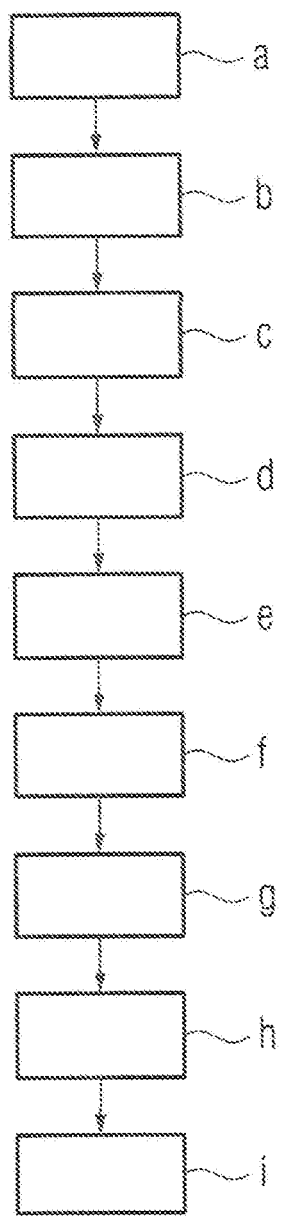
FIG. 1 shows a flowchart schematically depicting the method steps of a method in accordance with an embodiment of the present invention.

FIG. 1 is a schematic depiction of method steps a) to i) of a method in accordance with one embodiment of the present invention, which is used to create a redundant automation system 1 for an automation installation to be controlled 2.

In a first step a), information on the topology of a computer network 3 is provided. In the present case, the computer network 3 is the Internet. However, alternatively, the computer network 3 can also be a comparable computer network, such as a company intranet communicatively connecting a plurality of company locations to one another. The information provided in step a) is at least information on the structure or partial structure of the computer network 3, which is formed by communication hubs 4 and communication paths 5 interconnecting these to one another. The communication paths 5 can be wired and/or radio-based transmission links. Here, the information was obtained based on static information, such as maps showing currently existing submarine cables and radio-based transmission links. Further, information was also obtained by determining the network topology via network management protocols. In addition, in step a) supplementary information on the computer network 3 can be provided, such as information on transmission speeds of individual communication paths 5, information collected based on failure statistics relating to the probability of failure of communication hubs 4 and/or communication paths 5.

Figure 2:
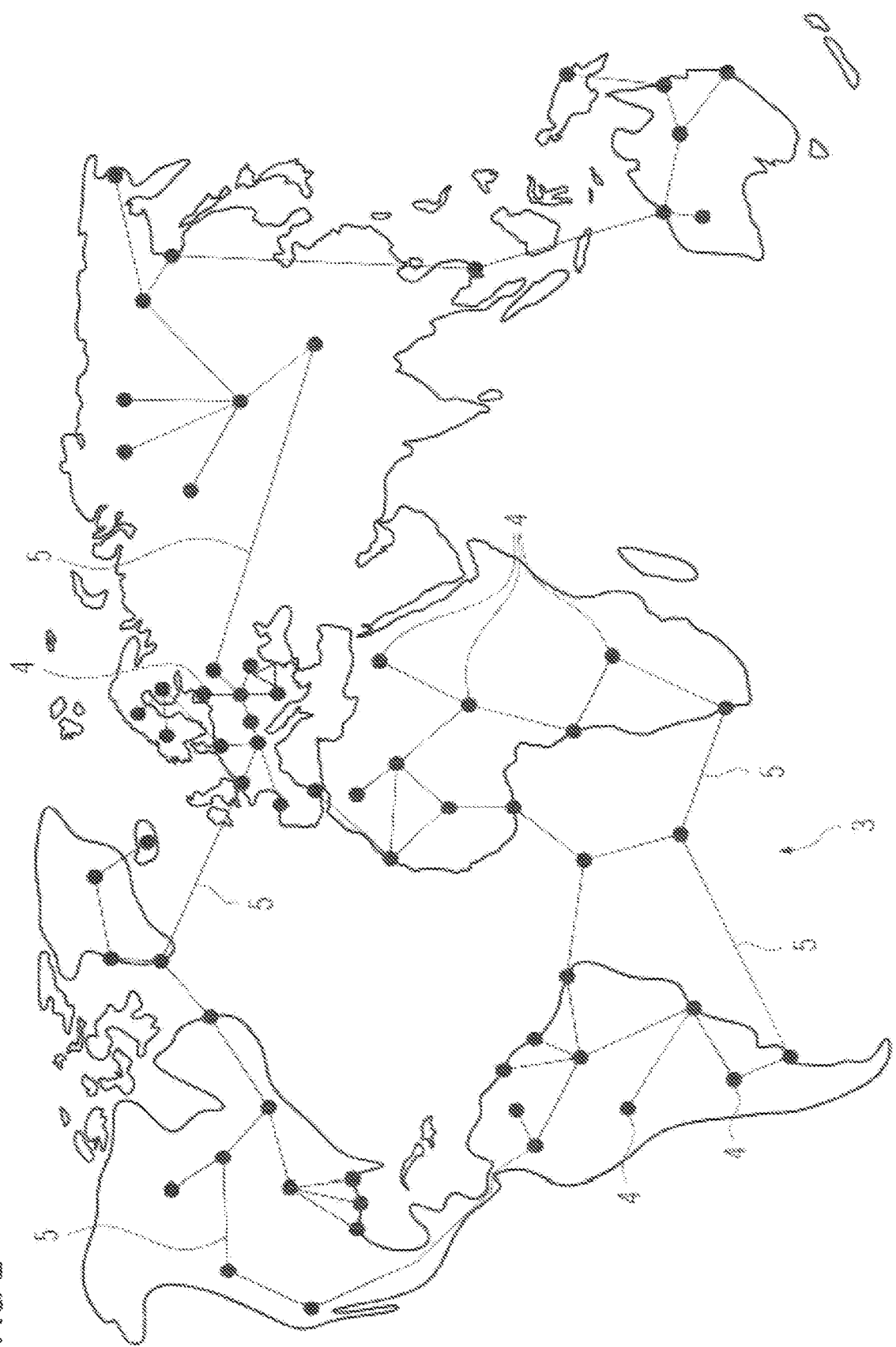
FIG. 2 shows a schematic view of a network topology in accordance with the invention.

FIG. 2 is an exemplary depiction of a network topology of the computer network 3 consisting of communication hubs 4 and communication paths 5, where a plurality of communication hubs 4 and communication paths 5 have been omitted for the sake of clarity.

Figure 3:
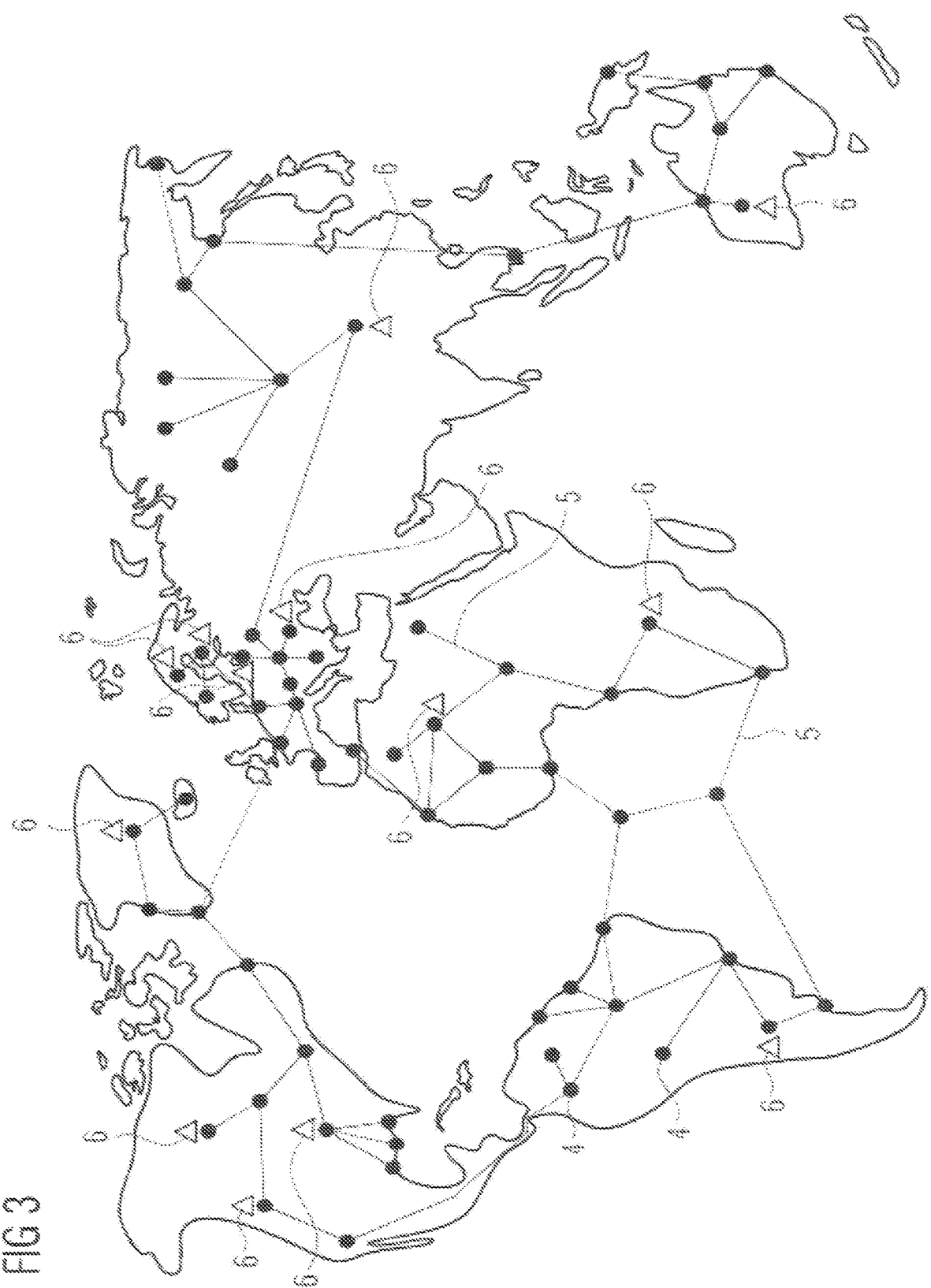
FIG. 3 shows a view in accordance with FIG. 2 with extended data centers.

In a further step b) information on computing centers 6 present within the network topology depicted in FIG. 2 or connected thereto including information on the locations thereof is provided. This is depicted schematically in FIG. 3.

Figure 4:
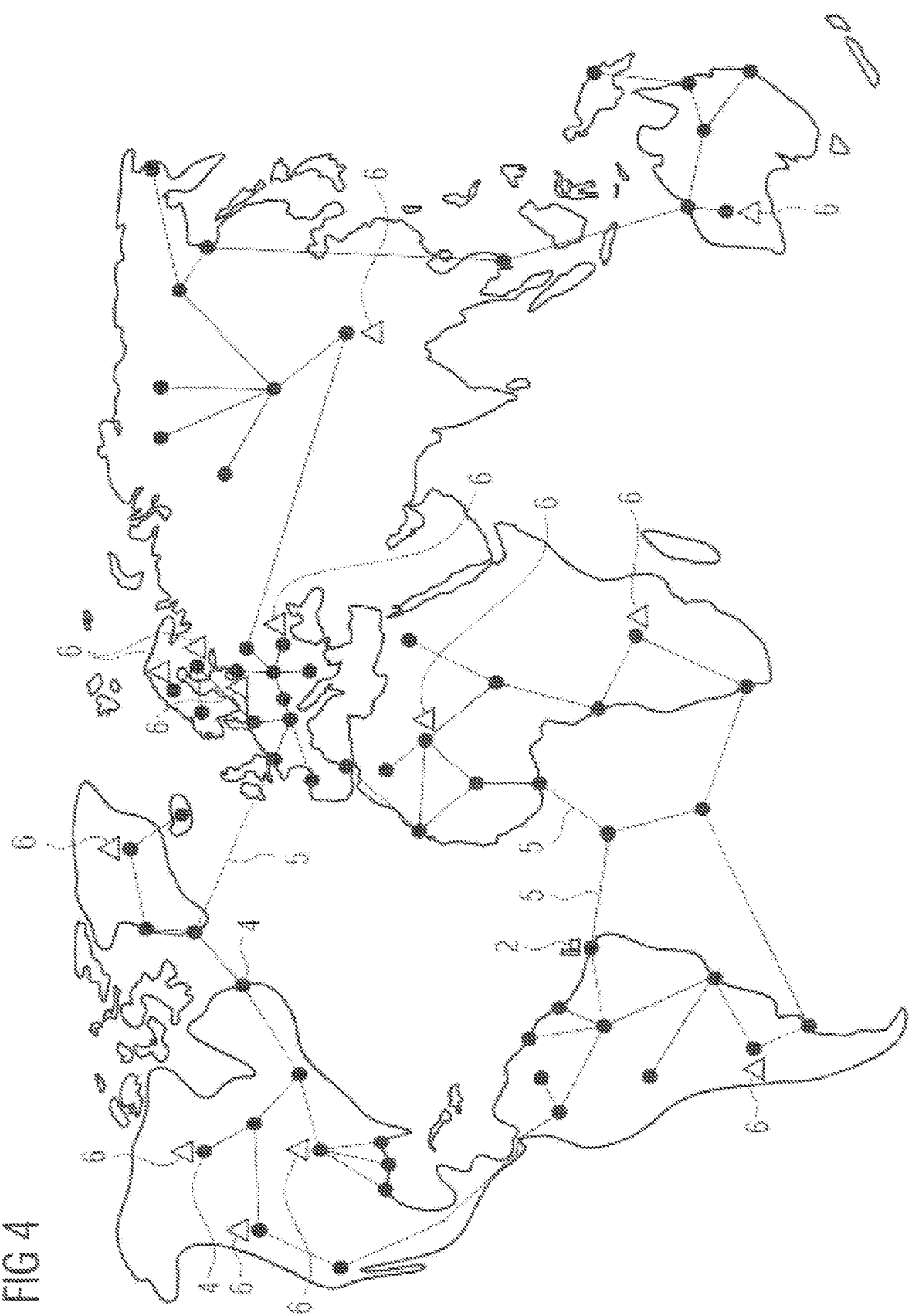
FIG. 4 shows a view in accordance with FIG. 3 with an extended automation installation.

If an automation system 1 is to be created now for an automation installation 2, in step c) the installation location of the automation installation 2 within the network topology is identified, see FIG. 4.

In a subsequent step d) at least one pair of computing centers 6 is then identified, which can be connected to the automation installation 2 within the network topology via communication paths 5 and which have a minimal number of overlaps and/or common communication hubs 4, in particular no overlaps and/or no common communication hubs. In the example depicted, a total of 22 such pairs can be formed. Each of these pairs comprise an African computing center 6 and a computing center 6 arranged outside Africa.

Figure 5:
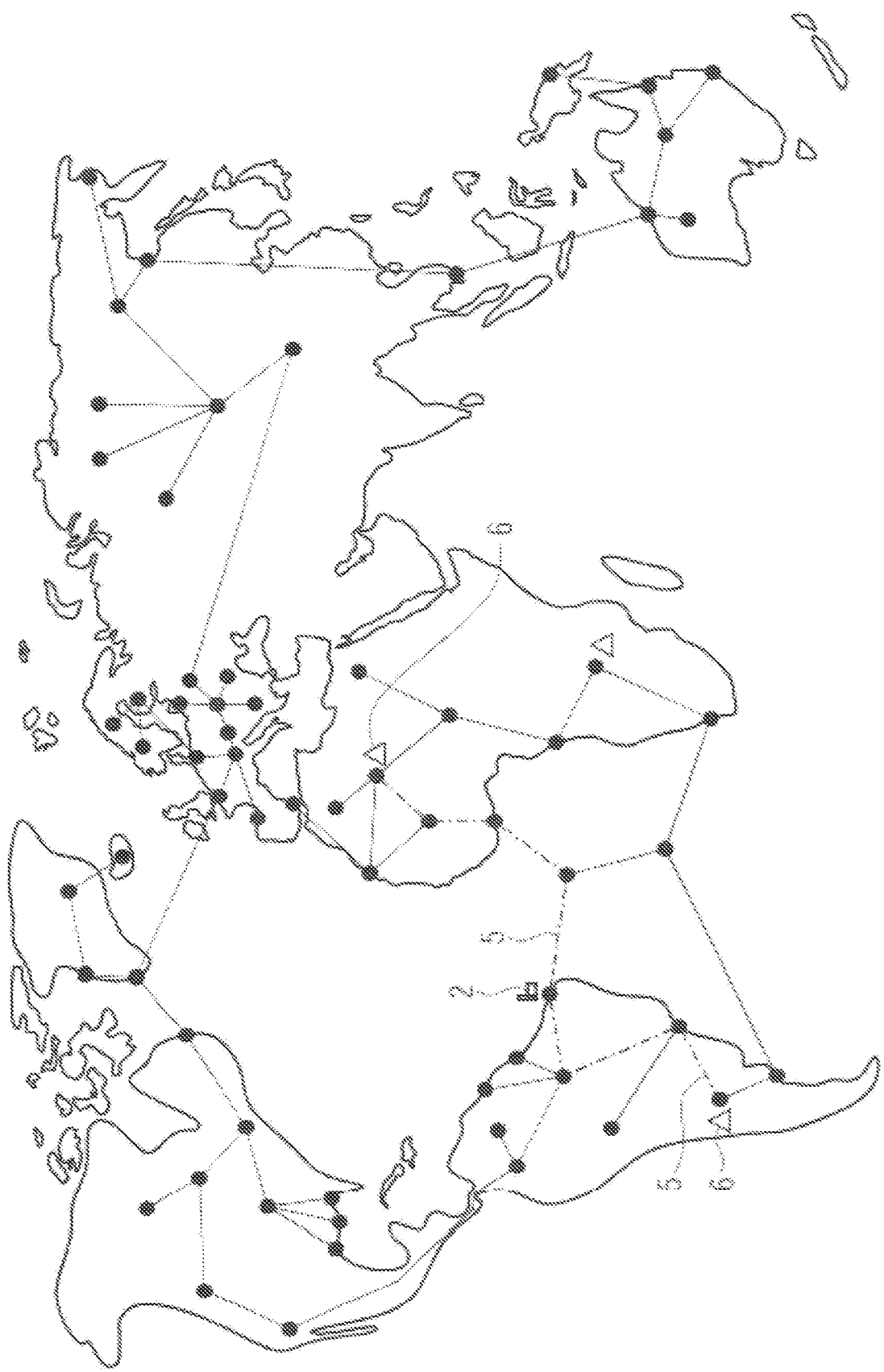
FIG. 5 shows a view in accordance with FIG. 4 with extended communication paths between the automation installation and selected computing centers.

In a further step e), a pair of computing centers 6 identified in step d) including the associated communication paths 5 is then selected. If, as in the present exemplary embodiment in step d), a plurality of pairs of computing centers 6 were identified, then the selection in step e) can occur based on further criteria, such as based on the above-mentioned transmission speeds of the individual communication paths 5, the probability of failure of communication hubs 4 and/or communication paths 5. Preferably, in step b) further additional information on the power supply and/or on the present utilization and/or on the computing power of the computing centers 6 is provided and can be used in step e) for selecting an optimal pair. For example, in step e), a check can be performed to determine which pairs of computing centers 6 have power supplies that are independent of each other, where only pairs of computing centers 6 with power supplies that are then independent of each other are included in the narrower selection. Alternatively or additionally, the present utilization of the computing centers 6 can be checked, where pairs with computing centers 6 with a low level of utilization are given preference. Alternatively or additionally, it is also possible for a comparatively high computing power of both computing centers 6 in a pair to be decisive for the selection. Weighting factors can be assigned to the individual additional criteria in order to weight them to a greater or lesser degree in the selection to be made in step e). FIG. 5 depicts the selection ultimately made in the present example.

In a step f), two control applications 7 configured to control the automation installation 2 are then provided. The control applications 7 are configured such that one of the control applications 7 operates as the master and the other control application 7 operates as the reserve, where in the event of the control application working as the master 7 failing, the control application operating as the reserve 7 takes over and functions as the master.

In the step g), the control applications 7 are stored in the computing centers 6 selected in step e).

Subsequently, in step h), the control applications 7 are coupled via a synchronization path 8, which is preferably selected such that the synchronization path 8 and the two communication paths 5 connecting the control applications 7 to the automation installation 2 have no overlaps and/or a minimal number of common communication hubs 4. If this not possible, then the communication paths 5 and the synchronization path 8 are selected such that they have as few overlaps and/or common hubs 4 as possible.

Figure 6:
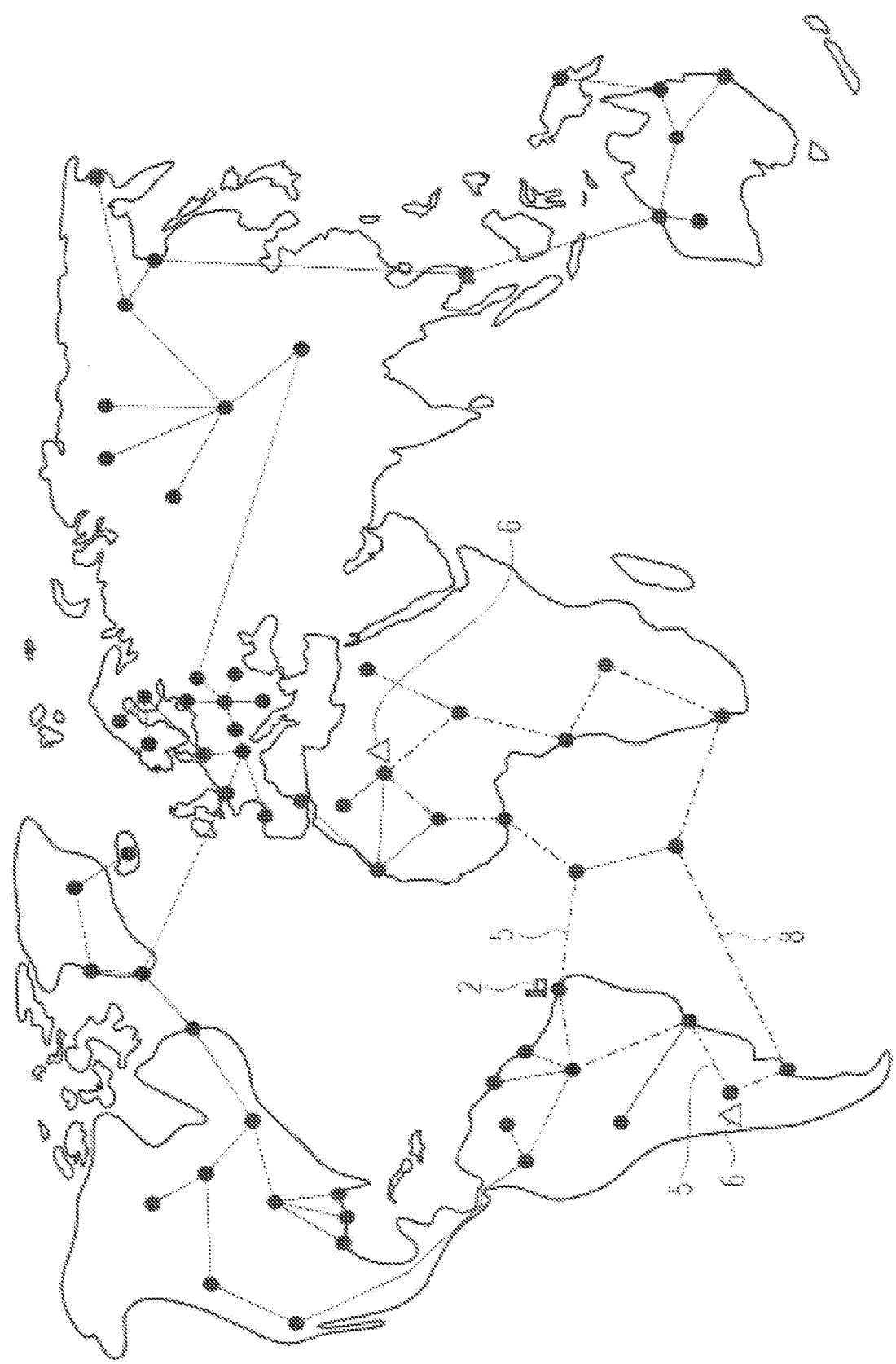
FIG. 6 shows a view in accordance with FIG. 5 with an extended selected synchronization path between the selected computing centers and FIG. 7 shows a schematic view of an automation system in accordance with an embodiment of the present invention created by performing the method depicted in the flowchart of FIG. 1.
Figure 7:
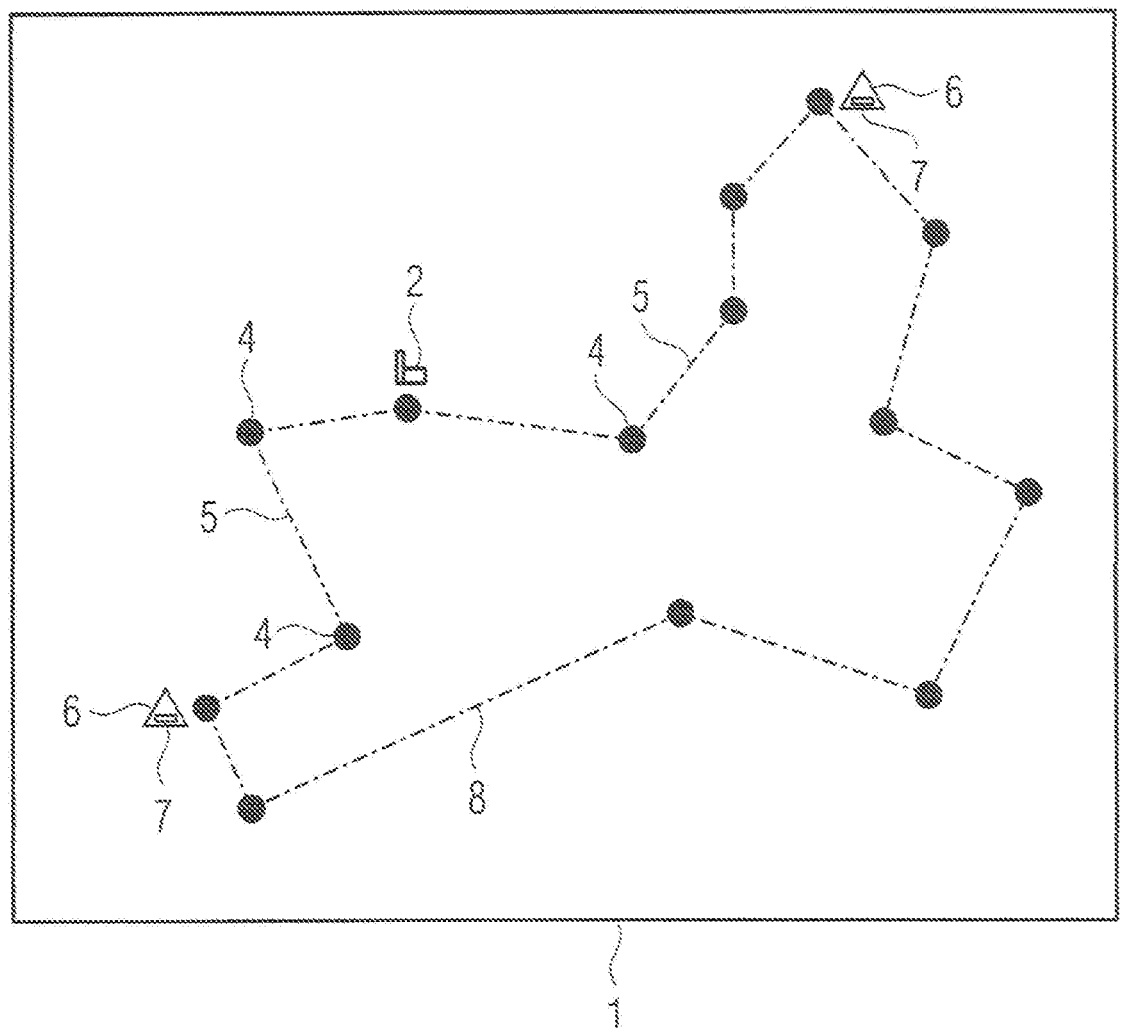

In step i), the control applications 7 are connected to the automation installation 2 via the communication paths 5 selected in step e) and the computing centers 6 via the selected synchronization path 8. This results in the arrangement depicted in FIG. 6 or the automation system depicted in FIG. 7.

In the present case, a computer program comprising program code means is provided which, when executed by the processor of at least one computer, cause the at least one computer to perform the above-described disclosed embodiments of the method in accordance with the invention. Only the identification of the installation location in step c) must occur via user input.

Even though its control applications 7 form a part of a cloud-computing structure, the automation system 1 in accordance with disclosed embodiments of the invention is characterized by very high level of availability. This availability can be further optimized by the type of synchronization mechanism with which the control applications 7 are synchronized and by the way in which the output data is handled in the redundant automation system 1. Here, reference is made to the method for operating a redundant automation system 1 disclosed in the publication EP 2 657 797 B1, which can also be transferred to the redundant automation system 1 with disclosed embodiments of the invention.

Although the invention has been illustrated and described in greater detail by the preferred exemplary embodiment, the invention is not restricted by the disclosed examples and other variations can be derived herefrom by the person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A redundant automation system comprising:
    at least one automation installation to be controlled, which is installed at an installation location;
    two control applications which are communicatively coupled to one another via a synchronization path, configured to control the automation installation, form part of a cloud-computing structure of which computing resources are provided at different locations and which are communicatively connected to the automation installation via the Internet or a comparable computer network;
    a plurality of communication hubs; and
    communication paths interconnecting said plurality of communication hubs to one another;
    wherein one of the control applications operates as a master and another control application operates as a reserve;
    wherein in an event the control application while operating as the master fails, the control application operating as the reserve takes over and function as the master; and
    wherein the locations of the computing resources for the control applications are selected such that the control applications are connected to the automation installation via two different communication paths having no or a minimal number of common communication hubs.

2. The automation system as claimed in claim 1, wherein the synchronization path connecting the two control applications to one another comprises a communication path of the Internet or the comparable computer network; and wherein the synchronization path and the two communication paths connecting the control applications to the automation installation have no or a minimal number of common communication hubs.

3. The automation system as claimed in claim 2, wherein the computing resources for the control applications are computing centers.

4. The automation system as claimed in claim 1, wherein the computing resources for the control applications are computing centers.

5. The automation system as claimed in claim 1, wherein the computing resources for the two control applications are decoupled from one another with respect to energy supply.

6. A method for creating a redundant automation system, the method comprising:
    a) providing information on a network topology of the Internet or a comparable computer network including information on a structure of a plurality of communication hubs of the redundant automation system in the network and on communication paths interconnecting said plurality of communication hubs of the redundant automation system;
    b) providing information on computing centers present within the network topology, said information including information on the locations computing centers;
    c) identifying an installation location of an automation installation to be controlled within the network topology;
    d) identifying at least one pair of computing centers which is connectable to the automation installation within the network topology via communication paths and which have a minimal number of at least one of (i) overlaps and (ii) common communication hubs;
    e) selecting said at least one pair of computing centers identified in step d) including associated communication paths;

f) providing two control applications configured to control the automation installation, the two control applications being configured such that one control application of the two control applications operates as a master and another control application of the two control applications operates as a reserve; and in an event the application operating as the master control fails, the control application operating as the reserve takes over and functions as the master;

g) storing the two control applications in the at least one pair of computing centers selected in step e);

h) coupling the two control applications via a synchronization path; and i) connecting the two control applications to the automation installation via the associated communication paths selected in step e).

7. The method as claimed in claim 6, wherein additional information on at least one of (i) a power supply (ii) a present utilization and (iii) a computing power of the at least one pair of computing centers is provided during step b); and wherein at least one item of said additional information is taken into account during said selection in step e).

8. The method as claimed in claim 6, wherein the synchronization path selected in step h) is selected such that the synchronization path and the two communication paths connecting the control applications to the automation installation have no or a minimal number of common communication hubs.

9. The method as claimed in claim 6, wherein the at least one pair of computing centers have no overlaps or no common communication hubs.

10. A non-transitory computer-readable medium encoded with computer program instructions, which, when executed by a processor of at least one computer, causes the at least one computer to creating a redundant automation system, the computer program instructions comprising:

a) program code for providing information on a network topology of the Internet or a comparable computer network including information on a structure of plurality of communication hubs of the redundant automation system in the network and on communication paths interconnecting said plurality of communication hubs of the redundant automation system;

b) program code for providing information on computing centers present within the network topology, said information including information on the locations computing centers;

c) program code for identifying an installation location of an automation installation to be controlled within the network topology;

d) program code for identifying at least one pair of computing centers, which is connectable to the automation installation within the network topology via communication paths and which have a minimal number of at least one of (i) overlaps and (ii) common communication hubs;

e) program code for selecting said at least one pair of computing centers identified in step d) including associated communication paths;

f) program code for providing two control applications configured to control the automation installation, the two control applications being configured such that one control application of the two control applications operates as a master and another control application of the two control applications operates as a reserve; and in an event the application operating as the master control fails, the control application operating as the reserve takes over and functions as the master;

g) program code for storing the two control applications in the at least one pair of computing centers selected in step e);

h) program code for coupling the two control applications via a synchronization path; and i) program code for connecting the two control applications to the automation installation via the associated communication paths selected in step e).

\* \* \* \* \*